United States Patent
Wildfeuer et al.

(10) Patent No.: US 9,674,515 B2
(45) Date of Patent: Jun. 6, 2017

(54) ENDPOINT INFORMATION FOR NETWORK VQM

(71) Applicant: Cisco Technology, Inc., San Jose, CA (US)

(72) Inventors: Herbert Michael Wildfeuer, Los Altos, CA (US); Da Lin, San Leandro, CA (US); Jing Hu, Santa Barbara, CA (US)

(73) Assignee: Cisco Technology, Inc., San Jose, CA (US)

( * ) Notice: Subject to any disclaimer, the term of this patent is extended or adjusted under 35 U.S.C. 154(b) by 209 days.

(21) Appl. No.: 13/939,251

(22) Filed: Jul. 11, 2013

(65) Prior Publication Data

US 2015/0015722 A1    Jan. 15, 2015

(51) Int. Cl.
| | | |
|---|---|---|
| H04N 7/173 | (2011.01) | |
| H04N 7/16 | (2011.01) | |
| H04H 60/32 | (2008.01) | |
| H04N 17/00 | (2006.01) | |
| H04N 19/46 | (2014.01) | |
| H04N 19/154 | (2014.01) | |
| H04N 21/24 | (2011.01) | |
| H04N 21/84 | (2011.01) | |
| H04N 21/442 | (2011.01) | |
| H04N 21/647 | (2011.01) | |

(52) U.S. Cl.
CPC ......... *H04N 17/004* (2013.01); *H04N 19/46* (2014.11); *H04N 19/154* (2014.11); *H04N 21/2404* (2013.01); *H04N 21/44209* (2013.01); *H04N 21/647* (2013.01); *H04N 21/84* (2013.01)

(58) Field of Classification Search
CPC .......................... H04N 12/004; H04N 19/154
USPC ........................................................ 348/192
See application file for complete search history.

(56) References Cited

U.S. PATENT DOCUMENTS

| | | | | |
|---|---|---|---|---|
| 5,473,361 A | * | 12/1995 | Penney | .......................... 725/143 |
| 7,117,521 B2 | * | 10/2006 | Puthiyedath | .................. 725/107 |
| 7,995,494 B2 | * | 8/2011 | Habib | ................. H04L 12/1868 370/252 |
| 8,743,954 B1 | * | 6/2014 | Masterson | ............... 375/240.05 |
| 8,997,160 B2 | * | 3/2015 | Hunt | ................ H04N 21/23439 709/231 |
| 2003/0140347 A1 | * | 7/2003 | Varsa | ................... H04N 21/236 725/90 |
| 2008/0037864 A1 | | 2/2008 | Zhang et al. | |

(Continued)

OTHER PUBLICATIONS

International Search Report mailed Oct. 10, 2014 cited in Application No. PCT/US2014/046007, 11 pgs.

(Continued)

*Primary Examiner* — Nasser Goodarzi
*Assistant Examiner* — Jaycee Imperial
(74) *Attorney, Agent, or Firm* — Merchant & Gould P.C.

(57) ABSTRACT

Video quality management (VQM) may be provided. First, transmitter metrics corresponding to a video stream may be determined by a transmitting endpoint. The determined transmitter metrics may then be transmitted from the transmitting end point and received by a receiver. The receiver may then determine receiver metrics for a video stream received at the receiver. A quality score may then be determined by the receiver. The quality score may be based on the received transmitter metrics and the determined receiver metrics.

27 Claims, 4 Drawing Sheets

(56) References Cited

U.S. PATENT DOCUMENTS

| | | | |
|---|---|---|---|
| 2009/0148058 A1* | 6/2009 | Dane et al. | 382/251 |
| 2010/0180315 A1* | 7/2010 | Nakamichi et al. | 725/116 |
| 2012/0201310 A1* | 8/2012 | Yamagishi et al. | 375/240.27 |
| 2013/0044224 A1* | 2/2013 | Liao et al. | 348/192 |
| 2013/0057705 A1* | 3/2013 | Parker et al. | 348/184 |
| 2013/0133011 A1* | 5/2013 | Chhaochharia | H04L 47/24 725/62 |
| 2013/0271668 A1* | 10/2013 | Argyropoulos et al. | 348/720 |
| 2013/0329050 A1* | 12/2013 | Pham et al. | 348/159 |
| 2014/0140612 A1* | 5/2014 | Xie et al. | 382/159 |

OTHER PUBLICATIONS

Mina Makar et al., "Compressionof VQM Features for Low Bit-Rate Video Quality Monitoring," Multimedia Signal Processing, IEEE 13th International Workshop, Oct. 17, 2011, 6 pgs.

Margaret H. Pinson et al., "A New Standardized Method for Objectively Measuring Video Quality," IEEE Transactions on Broadcasting, vol. 50, No. 3, Sep. 1, 2004, pp. 312-322.

European Office Action dated Oct. 28, 2016 cited in Application No. 14 747 207.0, 6 pgs.

* cited by examiner

ENDPOINT INFORMATION FOR NETWORK VQM

TECHNICAL FIELD

The present disclosure relates generally to streaming video data.

BACKGROUND

Digital video compression and communication have fundamentally changed the way people create, communicate, and consume visual information. As a part of advancing video technologies, measuring and monitoring delivered video quality has also attracted a significant amount of interest. Currently, most of the research and established international standards for video quality measurement (VQM) have focused on pixel level video quality measures.

BRIEF DESCRIPTION OF THE DRAWINGS

The accompanying drawings, which are incorporated in and constitute a part of this disclosure, illustrate various embodiments of the present disclosure. In the drawings.

DETAILED DESCRIPTION

Overview

Video quality management (VQM) may be provided. First, transmitter metrics corresponding to a video stream may be determined by a transmitting endpoint. The determined transmitter metrics may then be transmitted from the transmitting end point and received by a receiver. The receiver may then determine receiver metrics for a video stream received at the receiver. A quality score may then be determined by the receiver. The quality score may be based on the received transmitter metrics and the determined receiver metrics.

Both the foregoing overview and the following example embodiment are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Video Quality Management (VQM) may be provided by embodiments of the disclosure. VQM may include measuring a transmitted video quality of video segments or packets sent from a transmitting endpoint to a receiver. Conventional VQM services consume cycles in network devices (e.g., receivers) that could be better utilized by other services. Furthermore, with the video industry moving more towards encrypted video payloads, conventional VQM may become infeasible because it may not work on encrypted video.

Embodiments of the disclosure may unite transmitting endpoints and network devices (e.g., receivers) to fulfill the VQM function. Video quality metric gathering and calculations may be distributed among the transmitting endpoints and the network devices (e.g., receivers) to take advantages of each element's location and functionality in the overall end-to-end system. For example, embodiments of the disclosure may include performing portions of video quality calculations at the transmitting endpoint to produce transmitter metrics and have the transmitter metrics sent with video packets or through endpoint-to-endpoint protocols. Devices (e.g., receivers) in the network may then retrieve the information (e.g., transmitter metrics) and produce an overall video quality score by mapping network impairments such as packet loss, delay and jitter to the quality degradation that has been calculated by the transmitting endpoints in anticipation of the network impairments.

Distributing video quality monitoring among the transmitting endpoints and the network devices (e.g., receivers), consistent with embodiments of the disclosure, may take advantage of what each element does best and has most knowledge of. Moreover, embodiments of the disclosure may save CPU time (e.g., cycles) in the receiver because the receiver may avoid deep packet inspections because the receiver may have already received the transmitter metrics from the transmitting endpoint. In addition, embodiments of the disclosure may avoid problems caused when the video payload is encrypted because it may handle the video stream at a packet level.

The transmitting endpoint has access to the reference video and may have already performed intensive rate distortion analysis during the video encoding process. Consistent with embodiments of the disclosure, the transmitting endpoint may produce more accurate, full referenced quality metrics (e.g., transmitter metrics) with very little extra computation. With the ever evolving video coding standards and the error resilience coding mechanisms in the video codecs, it may be advantageous to have transmitting endpoints to convert coding schemes to quality measures (e.g., transmitter metrics) and report, for example, only the quality degradation of the compression and potential packet loss, delay and jitter.

Figure 1:
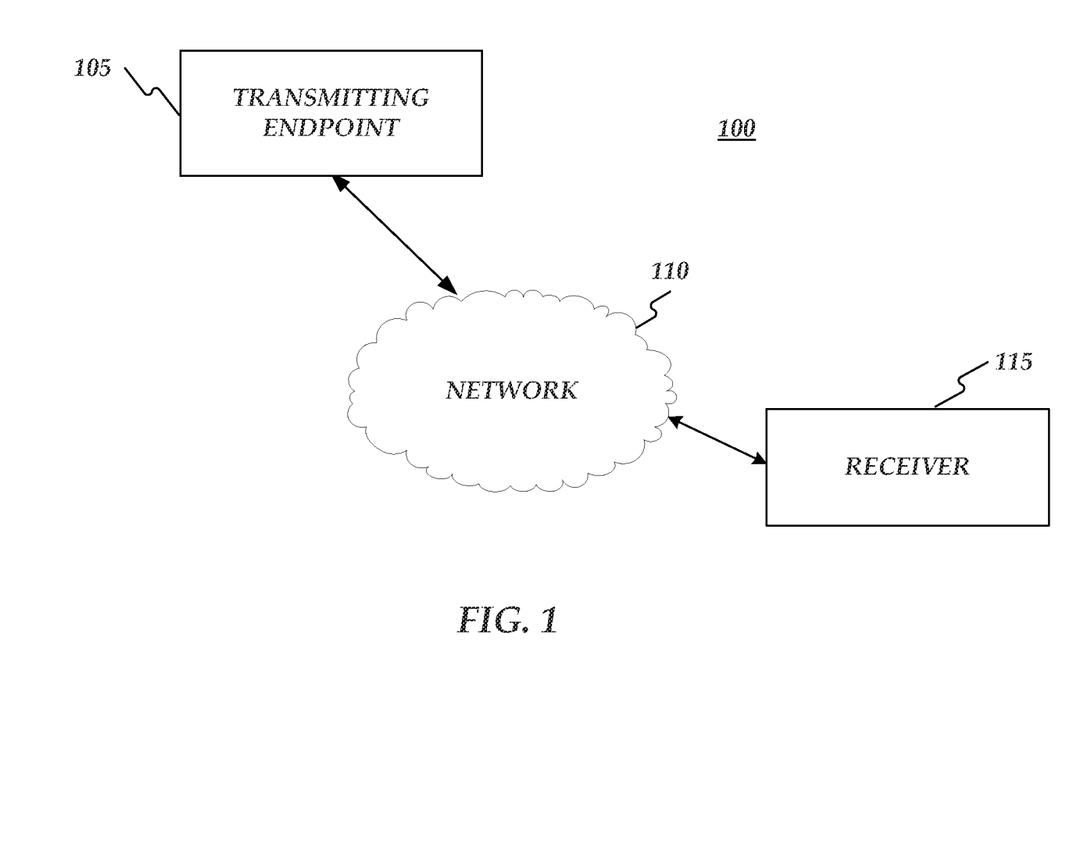
FIG. 1 shows an operating environment.

FIG. 1 shows an operating environment 100. As shown in FIG. 1, operating environment 100 may comprise transmitting endpoint 105, network 110, and receiver 115. Transmitting endpoint 105 may comprise a server located, for example, in a service provider head end that is capable of providing content through a video stream to receiver 115 over network 110. Content, for example, may comprise digital programs such as videos, television programs, movies, video-on-demand, unicast, and multicast broadcasts. The aforementioned are examples and the content may comprise other digital content forms.

The content may be communicated over network 110. Network 110 may be compatible with various communication protocols used to communicate the content. For example, transmitting endpoint 105 may communicate with receiver 115 over network 110 using a datagram protocol (UDP) or other protocol typically used to communicate transmissions over IP or non-IP networks such as Quadrature Amplitude Modulation (QAM) based content delivery. Furthermore, transmitting endpoint 105 may communicate with receiver 115 over network 110 using Transmission Control Protocol/Internet Protocol (TCP/IP).

Receiver 115 may comprise, but is not limited to, a network device, a network switch, a router, a Wi-Fi access point, a cellular base station, a switch servicing multiple clients in a vicinity, a tablet device, a mobile device, a mobile phone, a smart phone, a telephone, a remote control device, a set-top box, a digital video recorder, a cable modem, a personal computer, a network computer, a mainframe, other similar microcomputer-based devices, or any other computing device capable of communicating with transmitting endpoint 105 over network 110. Moreover, network 110 may comprise a mobile radio network, a wired or wireless IP network, or a television broadcasting network.

Figure 2:
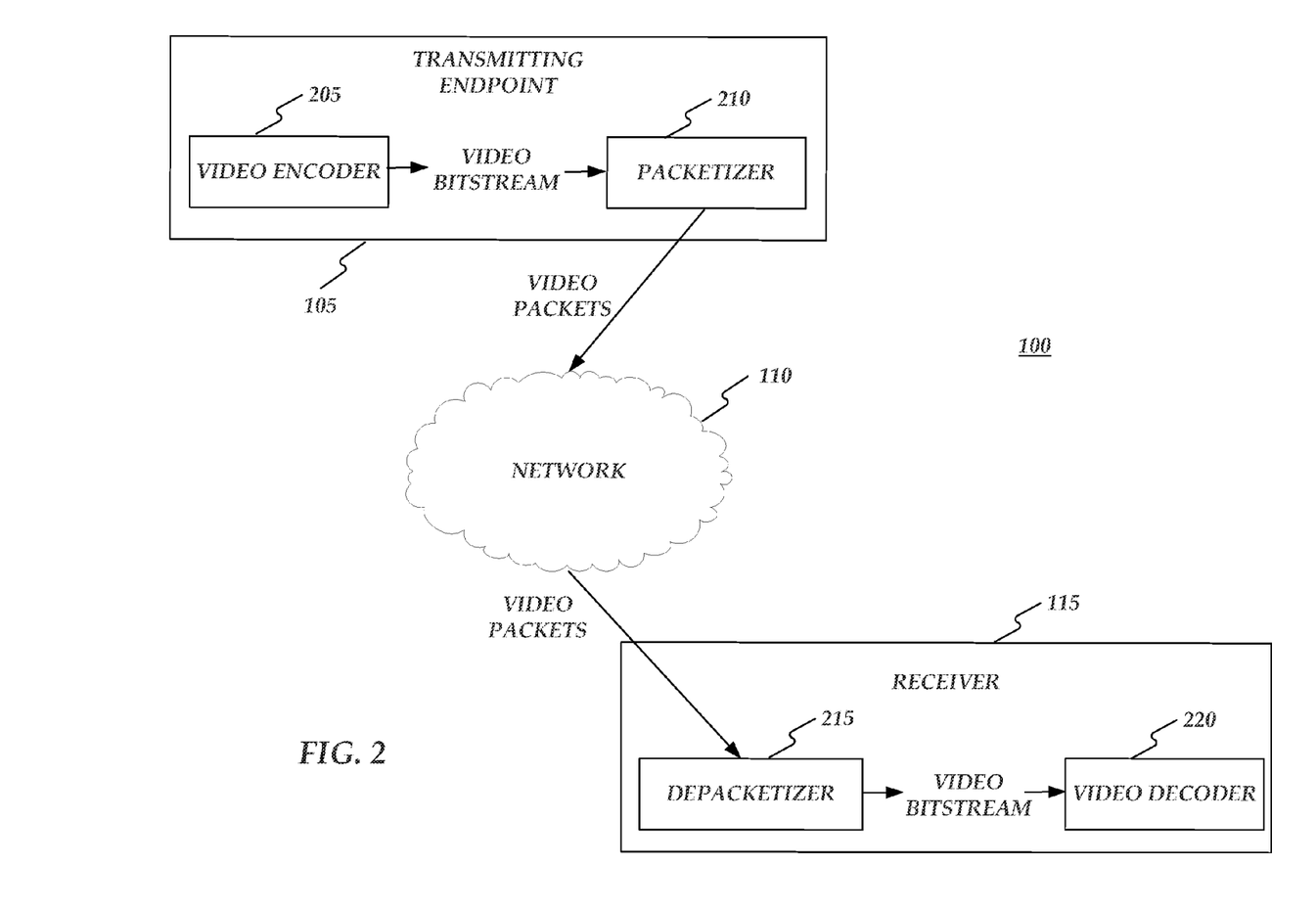
FIG. 2 shows an operating environment.

FIG. 2 shows operating environment 100 in more detail. As shown in FIG. 2, transmitting endpoint 105 may comprise a video encoder 205 and a packetizer 210. Receiver 115 may comprise a depacketizer 215 and a video decoder 220. Consistent with embodiments of the disclosure, uncompressed video may first be encoded by video encoder 205. An encoded video bitstream from video encoder 205 may then be packetized packetizer 210. Video packets from packetizer 210 may then be transmitted over network 110 to receiver 115. At receiver 115, the video packets may then be de-packetized by depacketizer 215 and then decoded by video decoder 220 to reconstruct the pixel values of the video frames in the content being provided by transmitting endpoint 105 over network 110 to receiver 115.

Figure 3:
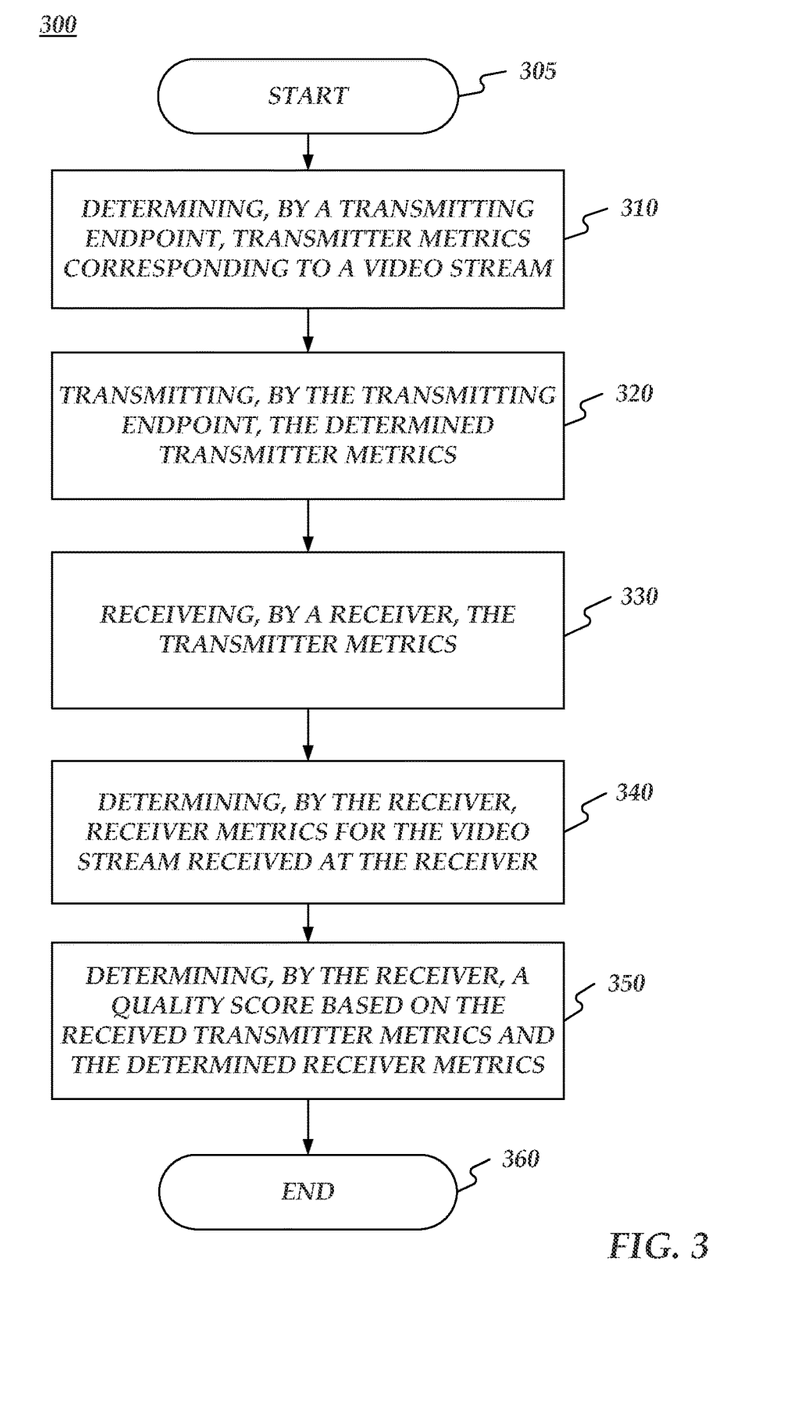
FIG. 3 is a flow chart of a method for providing video quality management (VQM)

FIG. 3 is a flow chart setting forth the general stages involved in a method 300 consistent with embodiments of the disclosure for providing video quality management. Method 300 may be implemented using, for example, transmitting endpoint 105 and/or receiver 115. A computing device 500, as described in more detail below with respect to FIG. 5, may comprise an operating environment for transmitting endpoint 105 or receiver 115. Ways to implement the stages of method 300 will be described in greater detail below.

Method 300 may begin at starting block 305 and proceed to stage 310 where transmitting endpoint 105 may determine transmitter metrics corresponding to a video stream. The transmitter metrics may be for a video segment sent by transmitting endpoint 105 or for a packet sent by transmitting endpoint 105. For example, transmitting endpoint 105 may produce, but is not limited to, one of more of the following four transmitter metrics either per video segment or per video packet. The per video segment transmitter metrics may comprise: i) compressed quality of a video segment; ii) quality degradation due to packet losses as a function of packet loss rate and burstiness; iii) quality degradation due to delay and jitter in a given video segment; iv) entropy (i.e. scene complexity); and v) motion estimation. A per video packet transmitter metric may comprise quality degradation if one or multiple neighboring packets are lost.

From stage 310, where transmitting endpoint 105 determines the transmitter metrics, method 300 may advance to stage 320 where transmitting endpoint 105 may transmit the determined transmitter metrics. For example, when transmitting the determined transmitter metrics, transmitting endpoint 105 may transmit the determined transmitter metrics in at least one Real-time Transport Protocol (RTP) header extension in the video stream that is being sent to receiver 115 over network 110. The aforementioned per video segment metrics may also be carried in endpoint to endpoint protocols such as Session Traversal Utilities for NAT (STUN) UDP packets. The video segment length may comprise, but is not limited to, 5 to 10 seconds. As will be described in more detail below, receiver 115 may calculate the overall quality at the end of the video segment so the delay in reporting is minimized.

Once transmitting endpoint 105 transmits the determined transmitter metrics in stage 320, method 300 may continue to stage 330 where receiver 115 may receive the transmitter metrics. For example, as stated above, receiver 115 may receive and parse the transmitter metrics from an RTP header extension in the video stream that is being sent from transmitting endpoint 105 to receiver 115 over network 110. In addition to RTP header extensions, as referenced above, STUN packets may also be utilized.

After receiver 115 receives the transmitter metrics in stage 330, method 300 may proceed to stage 340 where receiver 115 may determine receiver metrics for the video stream received. Receiver metrics may comprise those metrics that can only be measured at receiver 115. For example, receiver 115 may measure the packet loss, delay and jitter on receiver 115 for given video segments and packets received in the video stream from transmitting endpoint 105. Receiver 115 may retrieve the values of the transmitter metrics and produce an overall quality score of a video segment while taking into account the measured packet loss, delay and jitter measured on receiver 115.

From stage 340, where receiver 115 determines the receiver metrics, method 300 may advance to stage 350 where receiver 115 may determine a quality score based on the received transmitter metrics and the determined receiver metrics. For example, receiver 115 may observe (e.g., measure) no packet loss, delay or jitter in which case the overall quality score may comprise the compressed quality of a video segment. In another example, receiver 115 may observe (e.g., measure) packet loss and may be able to obtain packet loss statistics in terms of average packet loss rate and average packet loss burst length. In this case the overall quality score may be calculated using the compressed quality of a video segment and the quality degradation due to packet losses.

In yet another example of determining the quality score, receiver 115 may observe (e.g., measure) packet loss and may be able to spend some cycles to perform calculations per lost packet. In this case the overall quality score may comprise the compressed quality of a video segment subtracted by the quality degradation if one or multiple neighboring packets are lost. Moreover, when receiver 115 observes (e.g., measures) packet delay and jitter, the overall quality score may be calculated using the compressed quality of a video segment and by the quality degradation due to delay and jitter in this video segment. As stated above, the video segment length may comprise, but is not limited to, 5 to 10 seconds. Receiver 115 may calculate the overall quality at the end of the video segment so the delay in reporting is minimized.

The calculated quality score may be used to determine Quality of Service (QoS) corresponding to receiver 115. The QoS may include a generated estimated Mean Opinion Score (MOS). Furthermore adjustments may be made to receiver 115 to improve quality based on the calculated quality score. Once receiver 115 determines the quality score in stage 350, method 300 may then end at stage 360.

Figure 4:
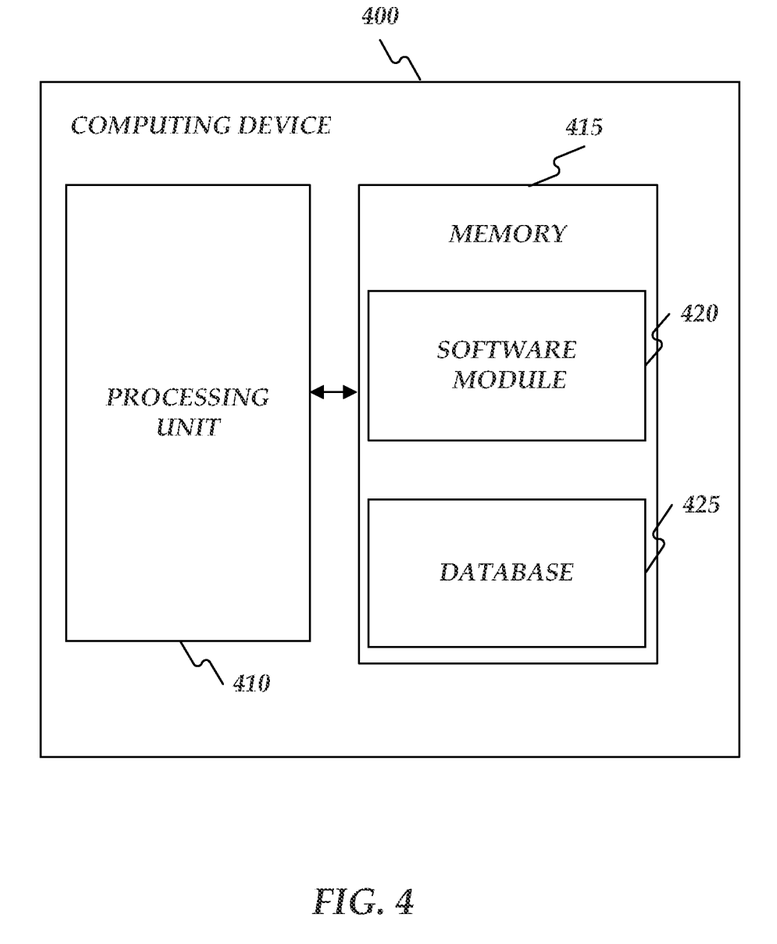
FIG. 4 shows a computing device.

FIG. 4 shows a computing device 400. As shown in FIG. 4, computing device 400 may include a processing unit 410 and a memory unit 415. Memory unit 415 may include a software module 420 and a database 425. While executing on processing unit 410, software module 420 may perform processes for providing video quality management, including for example, any one or more of the stages from method 300 described above with respect to FIG. 3. Computing device 400, for example, may provide an operating environment for transmitting endpoint 105 and/or receiver 115. Transmitting endpoint 105 and/or receiver 115 may operate in other environments and are not limited to computing device 400.

Computing device 400 ("the processor") may be implemented using a network device, a router, a network switch, a Wi-Fi access point, a cellular base station, a tablet device, a mobile device, a smart phone, a telephone, a remote control device, a set-top box, a digital video recorder, a cable modem, a personal computer, a network computer, a mainframe, or other similar microcomputer-based device. The processor may comprise any computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise, for example, a mobile terminal, such as a smart phone, a cellular telephone, a cellular telephone utilizing Wireless Application Protocol (WAP) or unlicensed mobile access (UMA), personal digital assistant (PDA), intelligent pager, portable computer, a hand held computer, a conventional telephone, or a Wireless Fidelity (Wi-Fi) access point. The aforementioned systems and devices are examples and the processor may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
    receiving, by a receiver, a video stream, the receiver comprising a network device of a video distribution system;
    receiving, by the receiver, transmitter metrics corresponding to a video segment of the received video stream, wherein receiving the transmitter metrics comprises extracting the transmitter metrics from the received video stream, the extracted transmitter metrics comprising a compressed quality of the video segment and a quality degradation due to packet losses as a function of packet loss rate and packet loss burst length for the video segment;
    determining, by the receiver, receiver metrics for the video stream received at the receiver; and
    determining, by the receiver, a quality score for the video segment based on the received transmitter metrics and the determined receiver metrics, wherein determining the quality score comprises:
  determining a network impairment for the received video segment from the determined receiver metrics, the network impairment comprising packet loss in the received video segment and the packet loss for packets received in the video stream;
  determining, based on the network impairment, an average packet loss rate and an average packet loss burst length for the received video segment;
  determining a drop corresponding to the determined average packet loss rate and the average packet loss burst length from the quality degradation due to packet losses as a function of packet loss rate and packet loss burst length for the video segment of the quality degradation metrics; and
  determining the quality score by adjusting the determined drop from the compressed quality, wherein determining the quality score further comprises determining the quality score to be the compressed quality of the video segment in the video stream subtracted by a measure of quality degradation due to delay and jitter in the video segment when the receiver observes packet delay and jitter.

2. The method of claim 1, wherein receiving the transmitter metrics comprises receiving the transmitter metrics on a per video segment basis of the video stream.

3. The method of claim 1, wherein receiving the transmitter metrics comprises receiving the transmitter metrics on a per video segment basis of the video stream wherein the first video quality comprise a measure of the compressed quality of the video segment.

4. The method of claim 1, wherein receiving the transmitter metrics comprises receiving the transmitter metrics on a per video packet basis of the video stream.

5. The method of claim 1, wherein receiving the transmitter metrics comprises receiving the transmitter metrics from a transmitting endpoint located in a service provider head end.

6. The method of claim 1, wherein receiving the transmitter metrics comprises receiving the transmitter metrics from a transmitting endpoint comprising one of the following: a server, a network switch, and a router.

7. The method of claim 1, wherein receiving the transmitter metrics comprises receiving the transmitter metrics in at least one of the following: in at least one Real-time Transport Protocol (RTP) header extension in the video stream and in at least one Session Traversal Utilities for NAT (STUN) UDP packet in the video stream.

8. The method of claim 1, wherein receiving by the receiver comprises receiving by the receiver wherein the receiver comprises one of the following: a server, a network switch, a router, and a user device.

9. The method of claim 1, wherein determining the receiver metrics for the video stream received at the receiver comprises determining the receiver metrics wherein the video stream is encrypted.

10. The method of claim 1, wherein determining the network impairment further comprises determining a measured packet loss corresponding to the video stream at the receiver.

11. The method of claim 1, wherein determining the network impairment further comprises determining a measure of the delay and jitter corresponding to the video stream at the receiver.

12. The method of claim 1, wherein determining the quality score comprises determining the quality score to be the compressed quality of the video segment in the video stream when the determined network impairments corresponding to the video segment in the video stream indicate that the receiver observes no packet loss, no delay, and no jitter in the video segment.

13. The method of claim 1, wherein determining the quality score comprises determining the quality score to be the compressed quality of a video segment in the video stream subtracted by the determined drop.

14. The method of claim 1, wherein determining the quality score comprises determining the quality score to be the compressed quality of the video segment in the video stream subtracted by a measure of the quality degradation due to at least one neighboring packet of a video pack in the video segment being lost when the receiver observes packet loss and is able to spend cycles to perform a calculation per lost packet.

15. The method of claim 1, further comprising using the calculated quality score to determine Quality of Service (QoS) corresponding to the receiver.

16. The method of claim 1, further comprising making an adjustment to the receiver to improve quality based on the calculated quality score.

17. An apparatus comprising:
  a memory storage; and
  a processing unit coupled to the memory storage, wherein the processing unit is operative to:
  receive, at a network device of a video distribution system, a video stream;
  receive transmitter metrics corresponding to a segment of the received video stream, wherein the processing unit being operative to receive the transmitter metrics comprises the processing unit being operative to extract the transmitter metrics from the received video stream, the extracted transmitter metrics comprising a compressed quality of the video segment and a quality degradation due to packet losses as a function of packet loss rate and packet loss burst length for the video segment;
  determine receiver metrics for the video segment of the received video stream; and
  determine a quality score for the video segment based on the received transmitter metrics and the determined receiver metrics, wherein the processing unit being operative to determine the quality score comprises the processing unit being operative to:
  determine network impairment for the received video stream from the determined receiver metrics, the network impairment comprising packet loss in the received video segment and the packet loss for packets received in the video stream;
  determine, based on the network impairment, an average packet loss rate and an average packet loss burst length for the received video segment;
  determine a drop corresponding to the determined average packet loss rate and the average packet loss burst length from the quality degradation due to packet losses as a function of packet loss rate and packet loss burst length for the video segment of the quality degradation metrics; and
  determine the quality score by adjusting the determined drop from the compressed quality, wherein the quality score is determined to be the compressed quality of the video segment in the video stream subtracted by a measure of quality degradation due to delay and jitter in the video segment when the receiver observes packet delay and jitter.

18. The apparatus of claim 17, wherein the processing unit being operative to receive the transmitter metrics comprises the processing unit being operative to receive the transmitter metrics from a transmitting endpoint.

19. The apparatus of claim 17, wherein the processing unit being operative to determine the network degradation for the video stream comprises the processing unit being further operative to determine a measure of the delay and jitter corresponding to the video stream at the network device.

20. A non-transitory computer-readable medium that stores a set of instructions which when executed perform a method executed by the set of instructions comprising:
   receiving, at a network device of a video distribution system, a video stream;
   receiving transmitter metrics corresponding to a video segment of the received video stream, wherein receiving transmitter metrics comprises extracting the transmitter metrics from the received video stream, the extracted transmitter metrics a compressed quality of the video segment and a quality degradation due to packet losses as a function of packet loss rate and packet loss burst length for the video segment;
   determining receiver metrics for the received video stream; and
   determining a quality score for the video segment based on the received transmitter metrics and the determined receiver metrics, wherein determining the quality score comprises:
   determining a network impairment for the received video segment from the determined receiver metrics, the network impairment comprising packet loss in the received video segment and the packet loss for packets received in the video stream;
   determining, based on the network impairment, an average packet loss rate and an average packet loss burst length for the received video segment;
   determining a drop corresponding to the determined average packet loss rate and the average packet loss burst length from the quality degradation due to packet losses as a function of packet loss rate and packet loss burst length for the video segment of the quality degradation metrics; and
   determining the quality score by adjusting the determined drop from the compressed quality, wherein determining the quality score further comprises determining the quality score to be the compressed quality of the video segment in the video stream subtracted by a measure of quality degradation due to delay and jitter in the video segment when the receiver observes packet delay and jitter.

21. The non-transitory computer-readable medium of claim 20, wherein determining the receiver metrics for the received video stream comprises determining the receiver metrics wherein the video stream is encrypted.

22. The non-transitory computer-readable medium of claim 20, wherein the network impairment for the received video stream further comprises a measured packet loss corresponding to the video stream at the network device.

23. The non-transitory computer-readable medium of claim 20, wherein the network impairment for the received video stream further comprises a measure of the delay and jitter corresponding to the video stream at the network device.

24. The non-transitory computer-readable medium of claim 20, wherein determining the quality score comprises determining the quality score comprising an estimated Mean Opinion Score (MOS).

25. The non-transitory computer-readable medium of claim 20, further comprising using the calculated quality score to do at least one of the following: determine Quality of Service (QoS) corresponding to a receiver and adjust the receiver to improve quality based on the calculated quality score.

26. The method of claim 1, wherein the transmitter metrics further comprises a scene complexity of the video segment and motion estimation for the vide segment.

27. The method of claim 1, further comprising making adjustment at the network device determined the quality score.

* * * * *